United States Patent
Ruse

[15] 3,698,159
[45] Oct. 17, 1972

[54] GAS ANALYZER AND MIST SEPARATOR

[72] Inventor: Alois Ruse, Stierstadt (Taunus), Germany

[73] Assignee: Hartmann & Braun Aktiengesellschaft, Frankfurt am Main, Germany

[22] Filed: Sept. 11, 1968

[21] Appl. No.: 759,134

[52] U.S. Cl. ..................55/257, 23/254 E, 55/73, 55/270, 55/274, 55/462, 55/466, 55/DIG. 34, 73/23
[51] Int. Cl. .............................................B01d 47/00
[58] Field of Search........55/220, 270, 465, 259, 257, 55/73, 274, 462, 466, DIG. 34; 73/23, 28; 23/217 C, 254 E

[56] References Cited

UNITED STATES PATENTS

| | | |
|---|---|---|
| 1,022,012 | 4/1912 | Whitney..................317/262 |
| 1,284,167 | 11/1918 | Welch......................55/122 X |
| 1,927,465 | 9/1933 | McIntosh...............55/270 X |
| 2,467,408 | 4/1949 | Semon ..................55/462 UX |
| 2,753,953 | 7/1956 | Tear .......................55/462 X |
| 2,772,750 | 12/1956 | Bystricky...............55/465 X |
| 2,912,064 | 11/1959 | Friedell........................55/464 |
| 3,052,318 | 9/1962 | Thomas..........................184/7 |
| 3,409,409 | 11/1968 | Sackett, Sr. .................23/283 |
| 3,483,678 | 12/1969 | Burdock et al. ............55/348 |
| 3,485,015 | 12/1969 | Vecchio...................55/270 X |

*Primary Examiner*—Dennis E. Talbert, Jr.
*Attorney*—Ralf H. Siegemund

[57] ABSTRACT

A device for gas analysis where sulfur trioxide mist droplets are entrained and are to be separated from a sample gas stream before the gas enters an analyzer. Entrained droplets are removed by passing the gaseous suspension through an entrance capillary and thence out through exit capillaries at right angles thereto and at the end thereof after coalescence of the droplets.

1 Claim, 2 Drawing Figures

GAS ANALYZER AND MIST SEPARATOR

BACKGROUND OF THE INVENTION

1. Field of the Invention
Gas analyzer having precipitator for infeed.

2. Description of the Prior Art.

In the measurement of concentrations of components of gases in which $SO_3$ is present as an objectional constituent, for example measurement of sulfur dioxide in the exit gases from a contact process converter for a sulfuric acid plant, $SO_3$ must be removed from the sample gas stream before the gas enters the analyzer in order to protect the instrument from the harsh action of the $SO_3$ gas which forms, with water, droplets which are difficult to condense or agglomerate. In general the removal of $SO_3$ has been carried out heretofore by either solid or fluid substances as chemical absorption agents. Since these agents become exhausted by use they must be monitored and be replenished or reactivated from time to time.

The present invention provides a simple maintenance-free device for the separation of $SO_3$ or sulfuric acid droplets from a sample gas stream by the well known precipitation action of centrifugal force during the deflecting of a gas stream containing the droplets in suspension. Conventional separating devices such as those having baffle plates have not proved satisfactory. Their efficiency is quite low when only one plate is used and when a number of plates are used in series the pressure-drop across the series becomes too great.

SUMMARY OF THE INVENTION

The present invention or separating device is characterized by the novel feature wherein the gas sample stream is led into a capillary member having a closed end terminating an entrance capillary constriction and having exit capillaries axially perpendicular thereto.

In order to separate out gaseous $SO_3$ by the present invention, the sample gas stream is dosed with an equivalent amount of water or water vapor before its entrance into the separating device, so that the gaseous $SO_3$ is completely converted to $SO_3$ or sulfuric acid droplets. This process permits the simultaneous determination of $SO_3$ content in the gas sample stream by making a concentration measurement, say, by a conductivity measurement, of the sulfuric acid separating out.

DESCRIPTION OF THE PREFERRED EMBODIMENT

Figure 1:
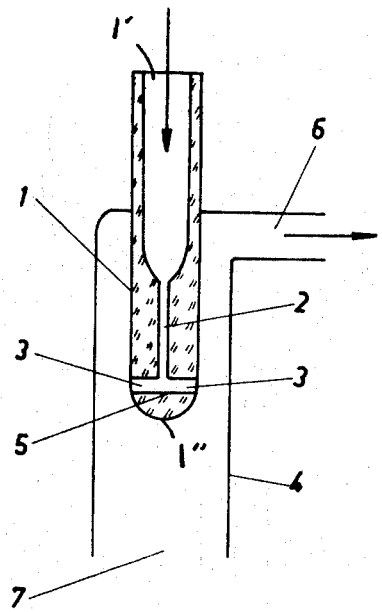
FIG. 1 shows the separator in detail and
FIG. 2 is a flow sheet showing a manner in which the separator is used.

The device according to FIG. 1 includes a cylinder 1 preferably of glass provided with an axial bore entrance 1' and capillary 2 as an extension thereof but terminating short of the end of the cylinder. At the closed end 1" of the cylinder, or the end of the capillary 2, are short outlet capillaries 3 axially perpendicular to capillary 2. Gas laden with $SO_3$ droplets enters the bore in the direction of the arrow and leaves the cylinder, after undergoing a right angular deflection at the end of capillary 2, through the exit capillaries 3.

It has been found that for gas analyzers with a gas through-put of from 25 to 100 liters per hr the capillary 2 should have a diameter not larger than 0.5 mm and capillaries 3 not larger than 2 mm, as for example, 0.3 mm and 1 mm respectively. The length of the capillaries is not critical. The concentration or agglomeration of the misty droplets of $SO_3$ to sulfuric acid takes place on the surface 5 and in the exit capillaries 3. The sulfuric acid liquid flows out exit capillary openings toward the bottom and drops off the end 1". Cylinder 1 projects downwardly into a surrounding jacket-like vessel 4 provided with an upper exit passageway means 6 for leading away gases freed from the droplets. A lower opening 7 is provided in the vessel for gas-tight connection to a final collection and reception device (not shown) for the condensate.

In the above description the droplets referred to have been termed $SO_3$ droplets as well as sulfuric acid droplets though their instantaneous compositions at various stages may vary. The exact point and degree of hydration is not of consequence so long as hexa-valent sulfur leaves the capillaries 3 as substantially continuous flowable liquid, rather than being carried in the gas. As will be explained below the droplets are most probably droplets of sulfuric acid.

Tests have shown that by using the simple device of FIG. 1 a practically complete separation of $SO_3$ mist from the sample gas flow to the subsequent analyzer is accomplished.

Figure 2:
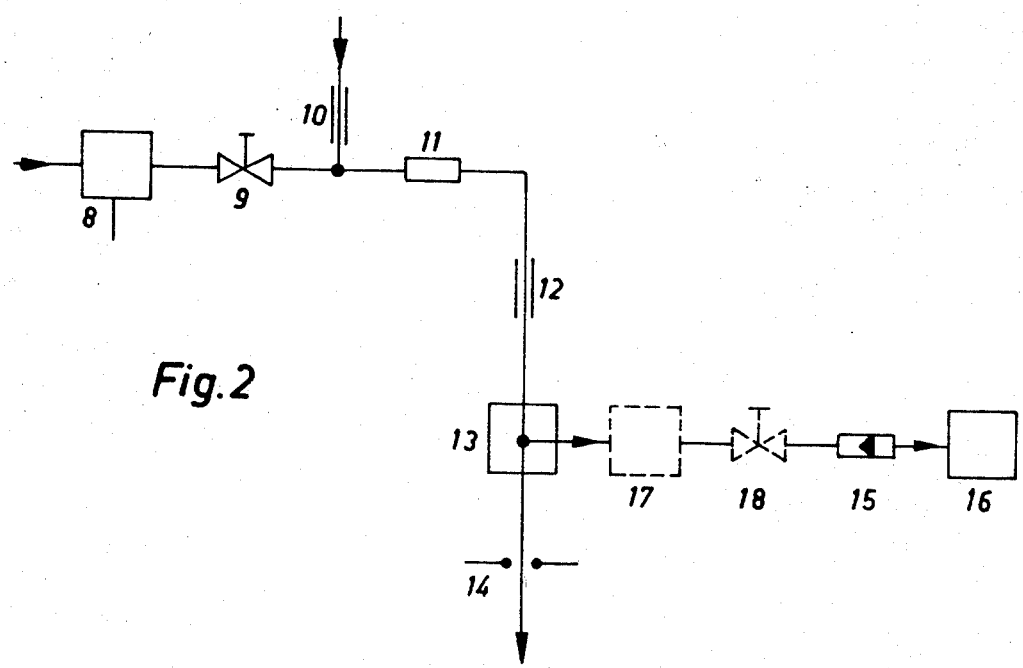

The flow sheet of FIG. 2 shows gas containing $SO_3$ entering at the arrow, assuming that it is supplied under pressure, into a usually cooled condensate separator 8. This condensate separator serves to reduce choking and liquid precipitation in the following valve 9, by which the rate of gas flow is controlled. Gas then passes a capillary 10 which continually doses the flowing gas with a chemically equivalent amount of water or water vapor sufficient to convert gaseous $SO_3$ completely into $SO_3$ mist and produce the highest possible $SO_3$ concentration for the dosed amount. The exothermic reaction so acts that eventually existing excess water is converted into water vapor. Since the reaction can run to completion, a residence chamber 11 is provided in which the gas has enough time to become saturated and completely combined with the water. The device as shown in FIG. 1, and schematically shown at 12, receives the reacted mixture containing the $SO_3$ mist droplets for the coalescing and separating out of the latter from the sample gas.

The sulfuric acid being separated out, as described of FIG. 1, is continually bled off through a separation chamber 13 which is in the nature of a separating and collecting device.

The $SO_3$ content of the sample gas stream can be determined indirectly by a concentration measurement of the sulfuric acid, for example by an electrical conductivity measuring means 14, since the conductivity is proportional to the $SO_3$ content.

The gas freed from $SO_3$ mist droplets ultimately arrives in the gas analyzer 16 after passing through a flow meter 15. In the event that the analysis gas is not supplied under positive pressure, the gas must be conveyed by a pump 17, furthermore a valve 18 for the regulation of the rate of gas flow then becomes necessary. Both the valve and pump are suitably inserted between the separating means and the flow meter 15. If the pump and regulator valve 18 are used, the condenser precipitator 8 and valve 9 may be omitted.

The device may be rotated in known manner to aid the flow of acid from the capillaries 3 and the coalescence of droplets therein. But the coalescence is thought to be substantially accomplished on the face 5 since it has been found that the length of the capillaries is essentially not critical. The right angle deflection of the flowing entrainment mixture imparts a centrifugal action in fact for precipitating action. Thus the device may be stationary or rotary.

I claim:

1. A combination device comprising gas sample supply means for supplying a sample of gas to be analyzed, means for hydrating sulfur trioxide in said sample of gas to form droplets therein, a gas analyzer means separator means to separate entrained droplets from the gas and to clean the gas substantially of corrosive hexa-valent sulfur before the gas enters said gas analyzer means, said separator means comprising a body having a bore defining an inlet for a sample of the gas containing the droplets, the body being provided with a conduit coaxial with the bore and less than 0.5 mm in internal diameter in communication with the bore at one end of said conduit and terminating within the body at the other end of said conduit, said body being provided with exit capillaries less than 2 mm in diameter opening to the exterior of the body and meeting and communicating with the other end of said conduit at right angles thereto, whereby gas entraining the droplets passing from the conduit is deflected through a right angle to precipitate the droplets as substantially liquid sulfuric acid, said device being dimensioned for a gas flow rate of from 25 to 100 liters per hour, said gas sample supply means being operatively constructed and arranged for supplying a sample of gas containing substantially gaseous sulfur trioxide, said means for hydrating sulfur trioxide being interposed between said gas sample supply means and said separator means, said means for hydrating sulfur trioxide comprising means operatively constructed and arranged for adding water to the gas to hydrate the sulfur trioxide substantially completely to sulfuric acid droplets, and means for measuring the concentration of said substantially liquid sulfuric acid which is precipitated by said separator means.

* * * * *